(12) United States Patent
Cheng (10) Patent No.: US 8,384,968 B2
(45) Date of Patent: Feb. 26, 2013

(54) TRANSMISSION MECHANISM AND SCANNING APPARATUS FOR SWITCHING OUTPUT POWERS

(75) Inventor: Sung-Po Cheng, Hsinchu (TW)

(73) Assignee: Avision Inc. (TW)

( * ) Notice: Subject to any disclaimer, the term of this patent is extended or adjusted under 35 U.S.C. 154(b) by 534 days.

(21) Appl. No.: 12/730,677

(22) Filed: Mar. 24, 2010

(65) Prior Publication Data
US 2011/0013239 A1     Jan. 20, 2011

(30) Foreign Application Priority Data

Jul. 14, 2009   (TW) ................................ 98123677 A (51) Int. Cl.
*H04N 1/04*     (2006.01)
*H04N 1/46*     (2006.01)
(52) U.S. Cl. ......... 358/497; 358/496; 358/498; 358/505
(58) Field of Classification Search .................... None
See application file for complete search history.

(56) References Cited

U.S. PATENT DOCUMENTS
2006/0005650 A1   1/2006 Chen

*Primary Examiner* — Thierry Pham

(57) ABSTRACT

A transmission mechanism for switching output powers includes first to fourth transmission gears, first and second power-connecting members and a driving mechanism. The first power-connecting member coaxially disposed between the first and second transmission gears is moved axially, and connects the first and second transmission gears together to transmit power to the second transmission gear. The second power-connecting member coaxially disposed between the third and fourth transmission gears is moved axially and connects the third and fourth transmission gears together to transmit power to the fourth transmission gear. The driving mechanism synchronously drives the first and second power-connecting members to move axially to selectively connect the first transmission gear to the second transmission gear, or connect the third transmission gear to the fourth transmission gear. A scanning apparatus using the transmission mechanism is also disclosed.

17 Claims, 11 Drawing Sheets

TRANSMISSION MECHANISM AND SCANNING APPARATUS FOR SWITCHING OUTPUT POWERS

This application claims priority of No. 098123677 filed in Taiwan R.O.C. on Jul. 14, 2009 under 35 USC 119, the entire content of which is hereby incorporated by reference.

BACKGROUND OF THE INVENTION

1. Field of the Invention

The invention relates to a transmission mechanism and a scanning apparatus using such transmission mechanism to switch output powers.

2. Related Art

In a conventional flatbed scanner, a scanning module is driven by a driving source, such as a motor, to reciprocate back and forth. Usually, the scanning module scans a document at a lower moving speed, and returns to a home position at a higher moving speed after the document is scanned, so that the time spent for the overall scanning process can be shortened. In addition, the moving speed of the scanning module may also be changed according to the scan resolution. Thus, the driving speed of the driving source is preferred to be variable.

In a conventional sheet-fed scanner, it is preferred that the speed at which the documents travel can be varied for high and low scan resolutions.

Often, an additional motor or driving source is employed to execute the switching operation of the power transmission members, such as gears, so that the output power of the power transmission members can be changed. However, the added motor occupies a large space in the scanner, and such scanner fails to achieve a truly compact design.

U.S. Patent Publication No. 2006/0005650 A1 discloses a rocker arm transmission device capable of switching the reduction ratio by changing the position of the rocker arm. In this transmission device, the switching operation is achieved by the meshing between the external teeth of the gears. This switching operation creates great challenges to the precision, strength and durability of the gears.

SUMMARY OF THE INVENTION

It is therefore an object of the invention to provide a transmission mechanism for switching output powers and a scanning apparatus using such transmission mechanism. The transmission mechanism, utilizing the internal structures of the gears, provides the connection between the members and performs the function of switching the output powers, such that the foregoing problems relating to the precision, structural strength and durability of the external teeth of the gears can be resolved.

To achieve the above-identified object, the invention provides a transmission mechanism for switching output powers. The transmission mechanism includes a first transmission gear, a second transmission gear, a first power-connecting member, a third transmission gear, a fourth transmission gear, a second power-connecting member and a driving mechanism. The first power-connecting member, the first transmission gear and the second transmission gear are coaxially disposed. The first power-connecting member is moveable along a first axis and connects the first transmission gear to the second transmission gear to transmit power to the second transmission gear. The second power-connecting member, the third transmission gear and the fourth transmission gear are coaxially disposed. The second power-connecting member is moveable along a second axis and connects the third transmission gear to the fourth transmission gear to transmit power to the fourth transmission gear. The driving mechanism synchronously drives the first power-connecting member and the second power-connecting member to move along the first axis and the second axis to selectively connect the first transmission gear to the second transmission gear, or connect the third transmission gear to the fourth transmission gear.

The invention also provides a scanning apparatus including a scanning module and the transmission mechanism. The scanning module movably disposed acquires an image of a document. The transmission mechanism drives the scanning module and switches a moving speed of the scanning module.

The invention further provides a scanning apparatus including a scanning module, a sheet-feeding mechanism and the transmission mechanism. The scanning module acquires an image of a document. The sheet-feeding mechanism transports the document. The transmission mechanism drives the sheet-feeding mechanism and switches a speed at which the sheet-feeding mechanism transports the document.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
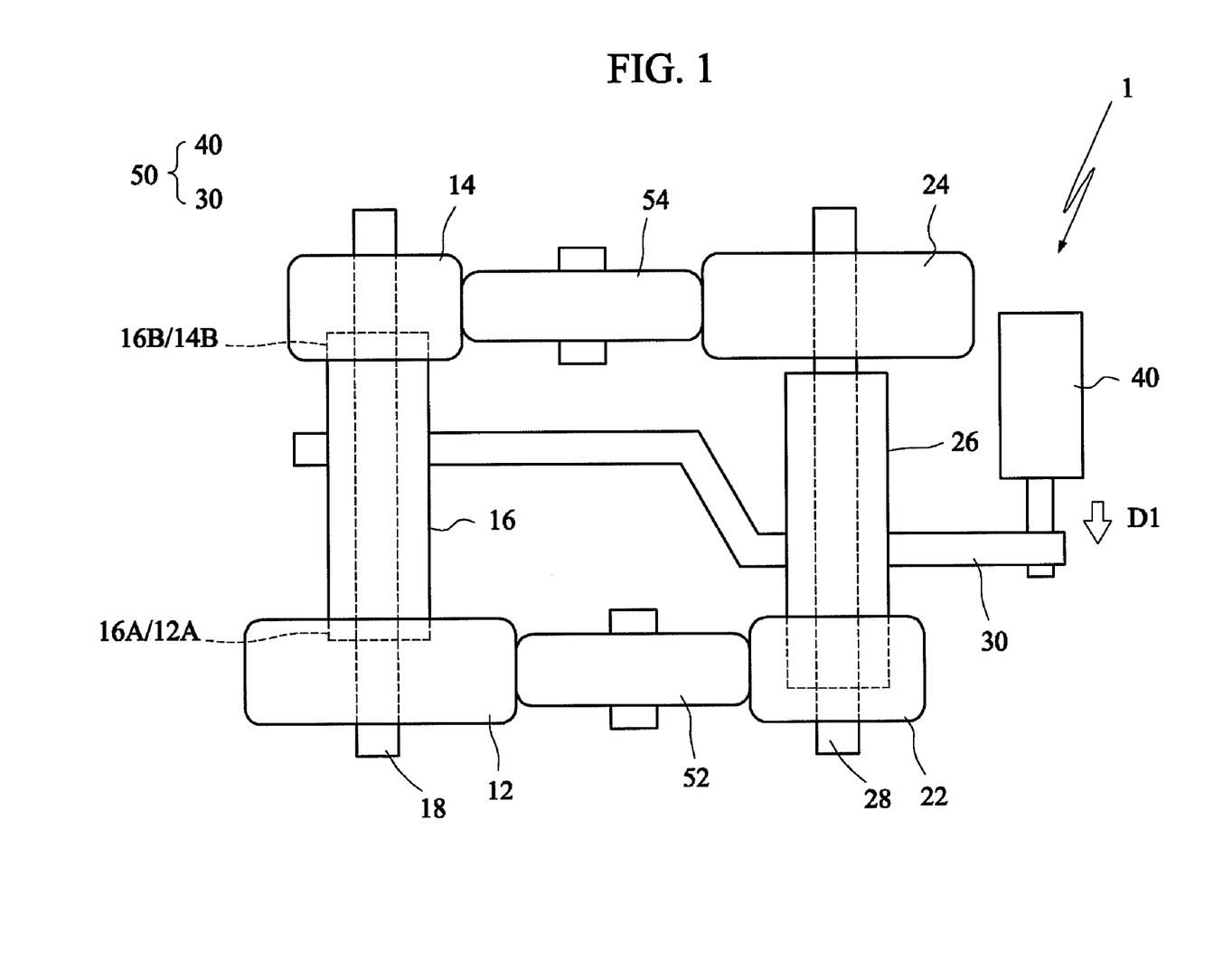
FIGS. 1 and 2 are schematic illustrations showing a transmission mechanism according to a first embodiment of the invention.
Figure 2:
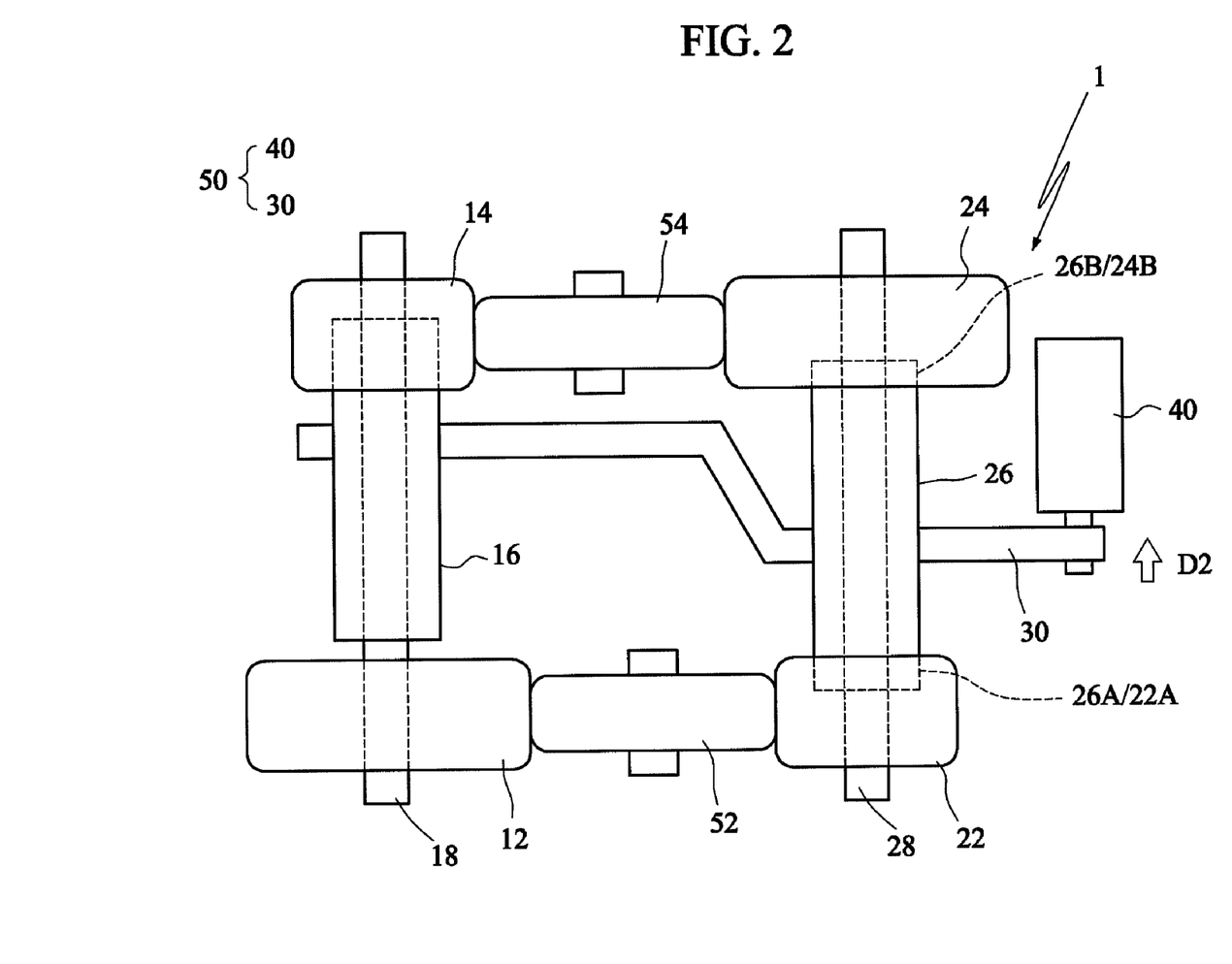
Figure 3:
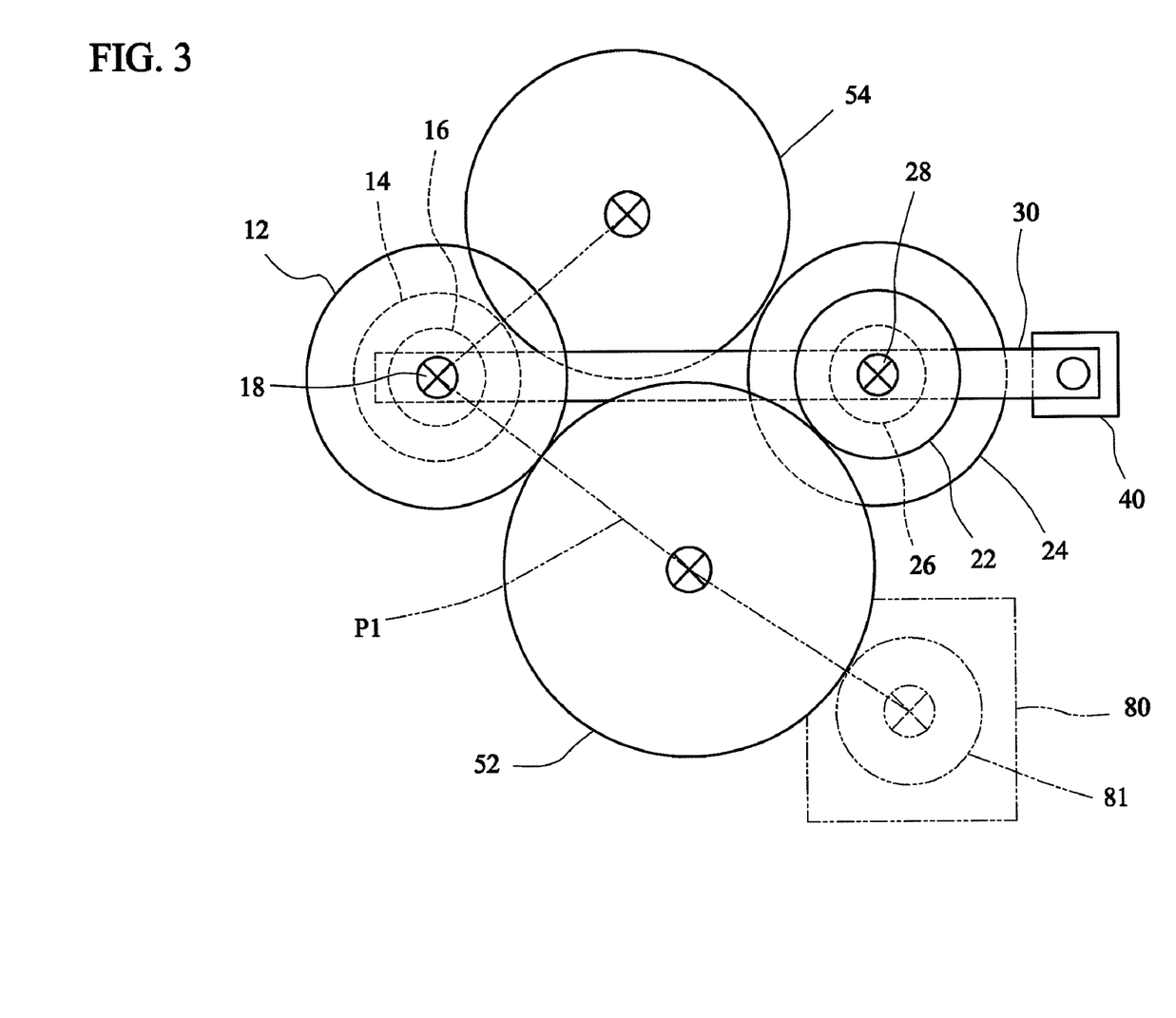
FIGS. 3 and 4 are side views showing the transmission mechanism according to the first embodiment of the invention.
Figure 4:
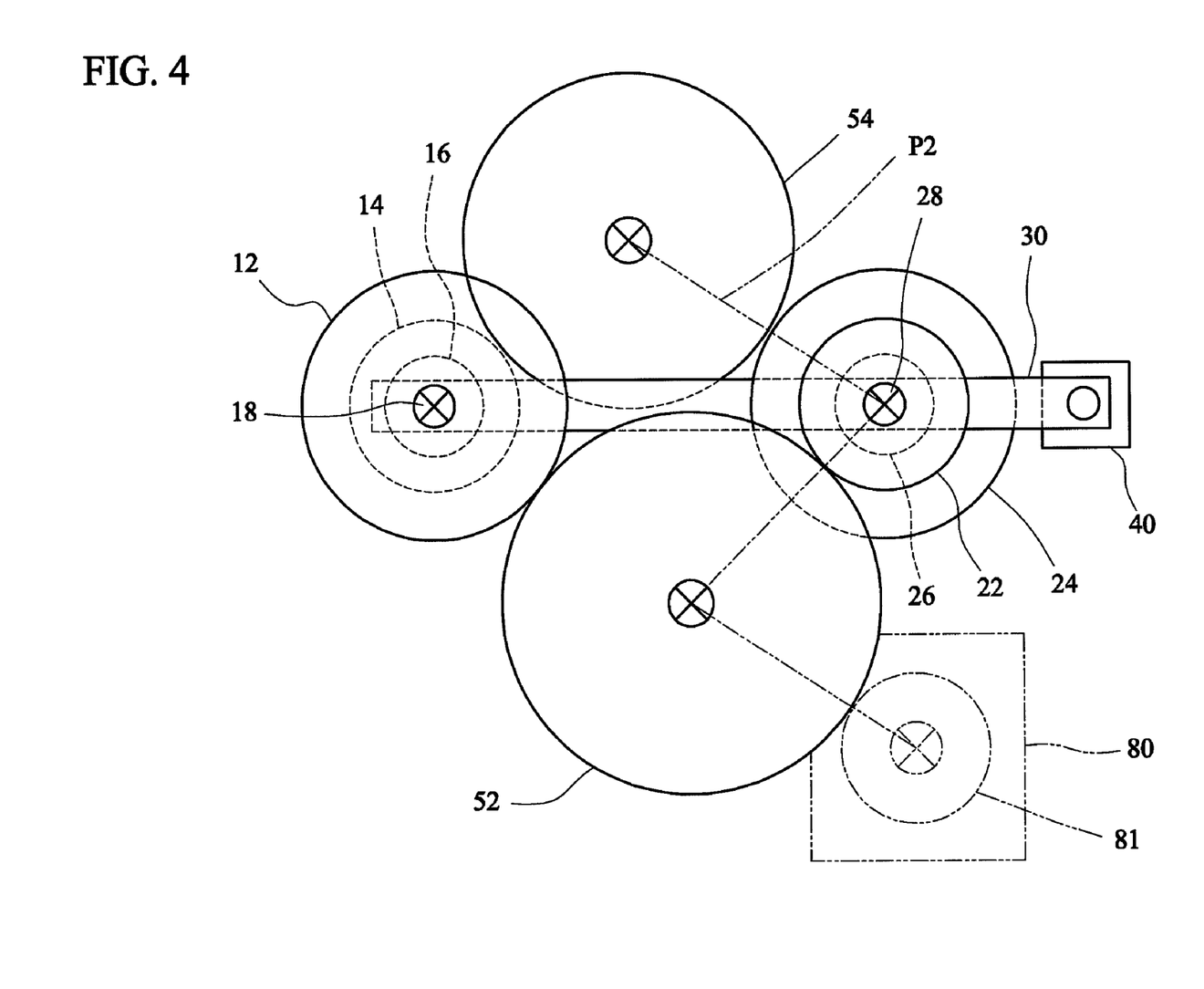

FIGS. 1 and 2 are schematic illustrations showing a transmission mechanism 1 according to a first embodiment of the invention. FIGS. 3 and 4 are side views showing the transmission mechanism 1 according to the first embodiment of the invention. Referring to FIGS. 1 to 4, the transmission mechanism 1 includes a first transmission gear 12, a second transmission gear 14, a first power-connecting member 16, a third transmission gear 22, a fourth transmission gear 24, a second power-connecting member 26 and a driving mechanism 50.

The first power-connecting member 16, the first transmission gear 12 and the second transmission gear 14 are coaxially disposed, for example, on a shaft 18, wherein the first power-connecting member 16 may slide along the shaft 18 and rotate relatively to the shaft 18, and the first transmission gear 12 and the second transmission gear 14 may be rotated relatively to the shaft 18. The first power-connecting member 16 is moveable along a first axis of the shaft 18 and functions to connect the first transmission gear 12 to the second transmission gear 14 in order to transmit the output power of the first transmission gear 12 to the second transmission gear 14. In this embodiment, the first power-connecting member 16 includes a first input meshing portion 16A and a first output meshing portion 16B which respectively mesh with a first internal meshing portion 12A of the first transmission gear 12 and a second internal meshing portion 14B of the second transmission gear 14.

The second power-connecting member 26, the third transmission gear 22 and the fourth transmission gear 24 are coaxially disposed, for example, on a shaft 28, wherein the second power-connecting member 26 may slide along the shaft 28 and rotate relatively to the shaft 28, and the third transmission gear 22 and the fourth transmission gear 24 may be rotated relatively to the shaft 28. The second power-connecting member 26 is moveable along a second axis of the shaft 28 and functions to connect the third transmission gear 22 to the fourth transmission gear 24 in order to transmit the power of the third transmission gear 22 to the fourth transmission gear 24. In this embodiment, the second power-connecting member 26 includes a second input meshing portion 26A and a second output meshing portion 26B which respectively mesh with a third internal meshing portion 22A of the third transmission gear 22 and a fourth internal meshing portion 24B of the fourth transmission gear 24.

The driving mechanism 50 synchronously drives the first power-connecting member 16 and the second power-connecting member 26 to move along the first axis and the second axis to selectively connect the first transmission gear 12 to the second transmission gear 14, or connect the third transmission gear 22 to the fourth transmission gear 24. In this embodiment, the driving mechanism 50 includes a driving member 30 and an actuator 40. The driving member 30 synchronously moves the first power-connecting member 16 and the second power-connecting member 26. The actuator 40, such as a solenoid, drives the driving member 30 to move in a first direction D1 and a second direction D2.

In addition, the transmission mechanism 1 may further include an input terminal transmission gear 52 and an output terminal transmission gear 54. The input terminal transmission gear 52 meshes with the first transmission gear 12 and the third transmission gear 22 to transmit power to the first transmission gear 12 and the third transmission gear 22. The output terminal transmission gear 54 meshes with the second transmission gear 14 and the fourth transmission gear 24 and receives a first output power transmitted from the second transmission gear 14 or a second output power transmitted from the fourth transmission gear 24.

As shown in FIG. 1, the driving mechanism 50 moves the first power-connecting member 16 in the first direction D1 to connect the first input meshing portion 16A to the first internal meshing portion 12A of the first transmission gear 12, and thus connect the first transmission gear 12 to the second transmission gear 14. At this time, the second power-connecting member 26 is also moved in the first direction D1 synchronously, and is thus disconnected from the fourth transmission gear 24. The power transmission path is represented by the path P1 of FIG. 3. The input terminal transmission gear 52 may mesh with a driving gear 81 of a motor 80 to thereby transmit the power from the motor 80 to the output terminal transmission gear 54 through the input terminal transmission gear 52, the first transmission gear 12 and the second transmission gear 14.

As shown in FIG. 2, the driving mechanism 50 moves the second power-connecting member 26 in the second direction D2 to connect the second output meshing portion 26B to the fourth internal meshing portion 24B of the fourth transmission gear 24, and thus connect the third transmission gear 22 to the fourth transmission gear 24. At this time, the first power-connecting member 16 is also moved in the second direction D2 synchronously, and is thus disconnected from the first transmission gear 12. Thus, the power transmission path is represented by the path P2 of FIG. 4. The power of the motor 80 is transmitted to the output terminal transmission gear 54 through the input terminal transmission gear 52, the third transmission gear 22 and the fourth transmission gear 24.

In the transmission mechanism 1 shown in FIGS. 1 and 2, the first output meshing portion 16B of the first power-connecting member 16 permanently meshes with the second internal meshing portion 14B, and the second input meshing portion 26A of the second power-connecting member 26 permanently meshes with the third internal meshing portion 22A.

Figure 5:
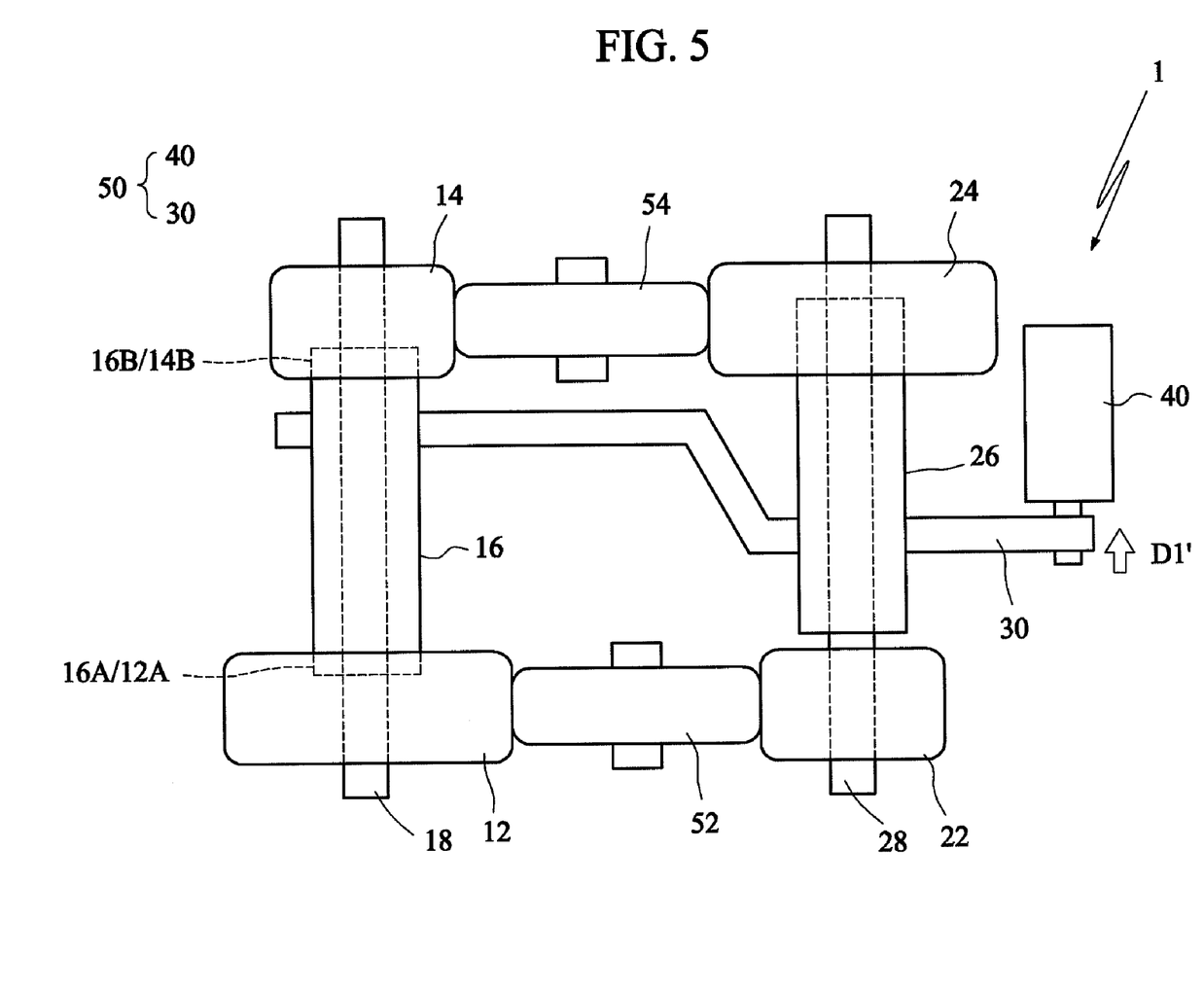
FIGS. 5 and 6 are schematic illustrations showing a transmission mechanism of another driving method according to the first embodiment of the invention.
Figure 6:
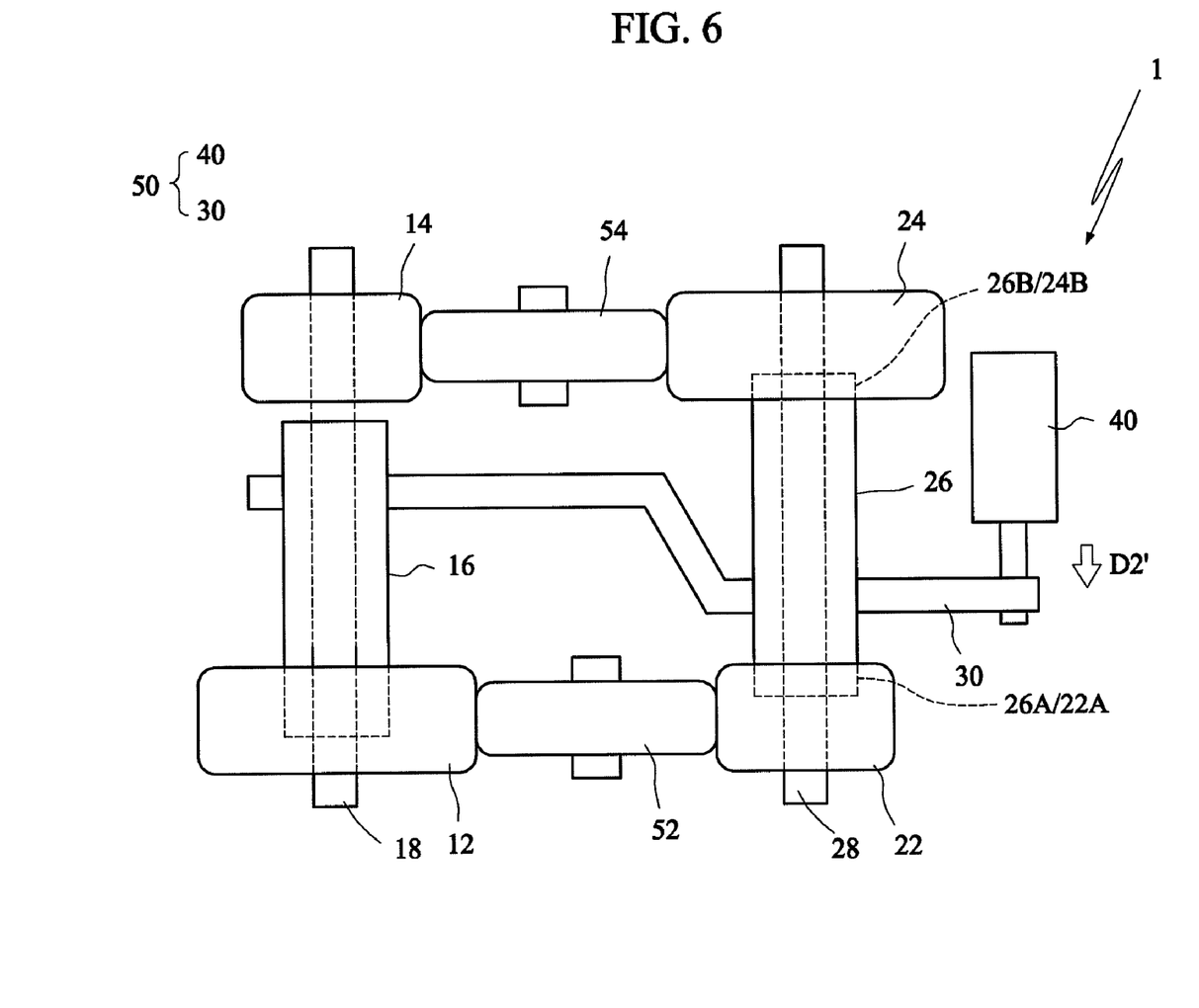

FIGS. 5 and 6 are schematic illustrations showing a transmission mechanism of another driving method according to the first embodiment of the invention. As shown in FIGS. 5 and 6, this embodiment is similar to the above-mentioned implementation except for the differences to be described hereinafter.

As shown in FIG. 5, the driving mechanism 50 moves the first power-connecting member 16 in a first direction D1' to enable the first output meshing portion 16B to mesh with the second internal meshing portion 14B of the second transmission gear 14 and thus to connect the first transmission gear 12 to the second transmission gear 14. At this time, the second power-connecting member 26 is also synchronously moved in the first direction D1' and is thus disconnected from the third transmission gear 22.

As shown in FIG. 6, the driving mechanism 50 moves the second power-connecting member 26 in a second direction D2' to enable the second input meshing portion 26A to mesh with the third internal meshing portion 22A of the third transmission gear 22 to connect the third transmission gear 22 to the fourth transmission gear 24. At this time, the first power-connecting member 16 is also synchronously moved in the second direction D2' and is thus disconnected from the second transmission gear 14.

In the transmission mechanism 1 shown in FIGS. 5 and 6, the first input meshing portion 16A of the first power-connecting member 16 permanently meshes with the first internal meshing portion 12A, and the second output meshing portion 26B of the second power-connecting member 26 permanently meshes with the fourth internal meshing portion 24B.

Figure 7:
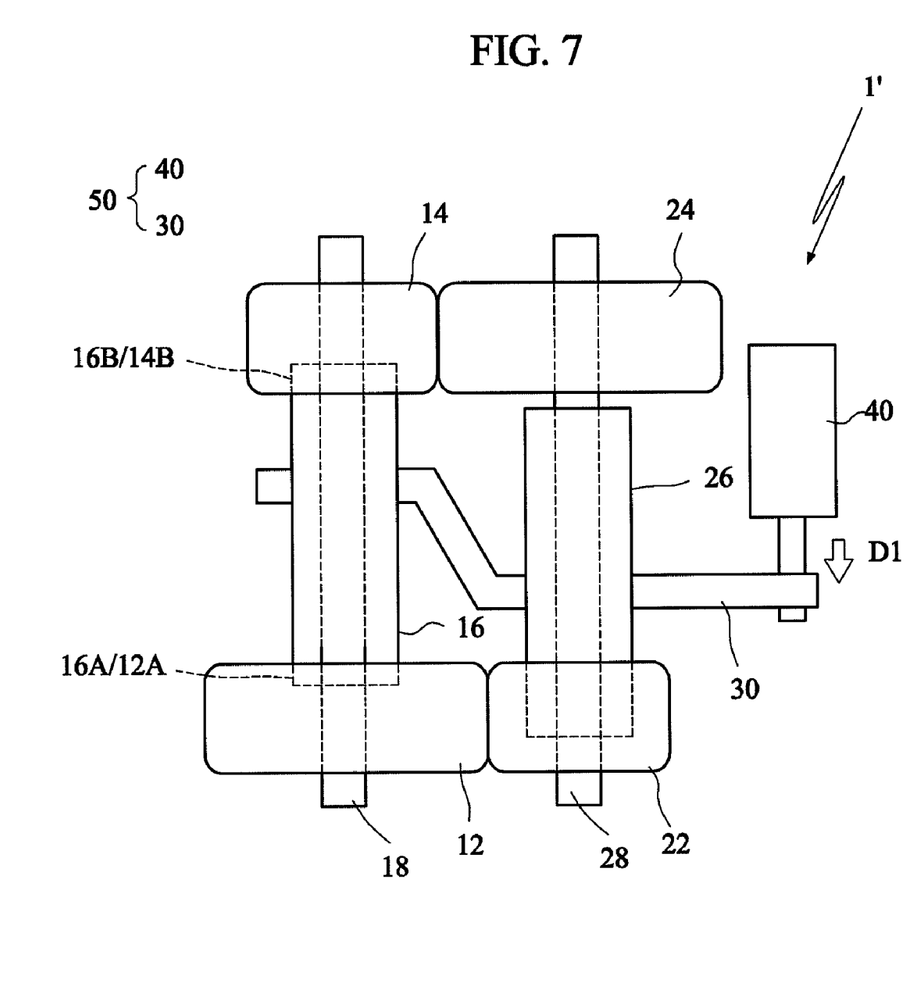
FIGS. 7 and 8 are schematic illustrations showing a transmission mechanism according to a second embodiment of the invention.
Figure 8:
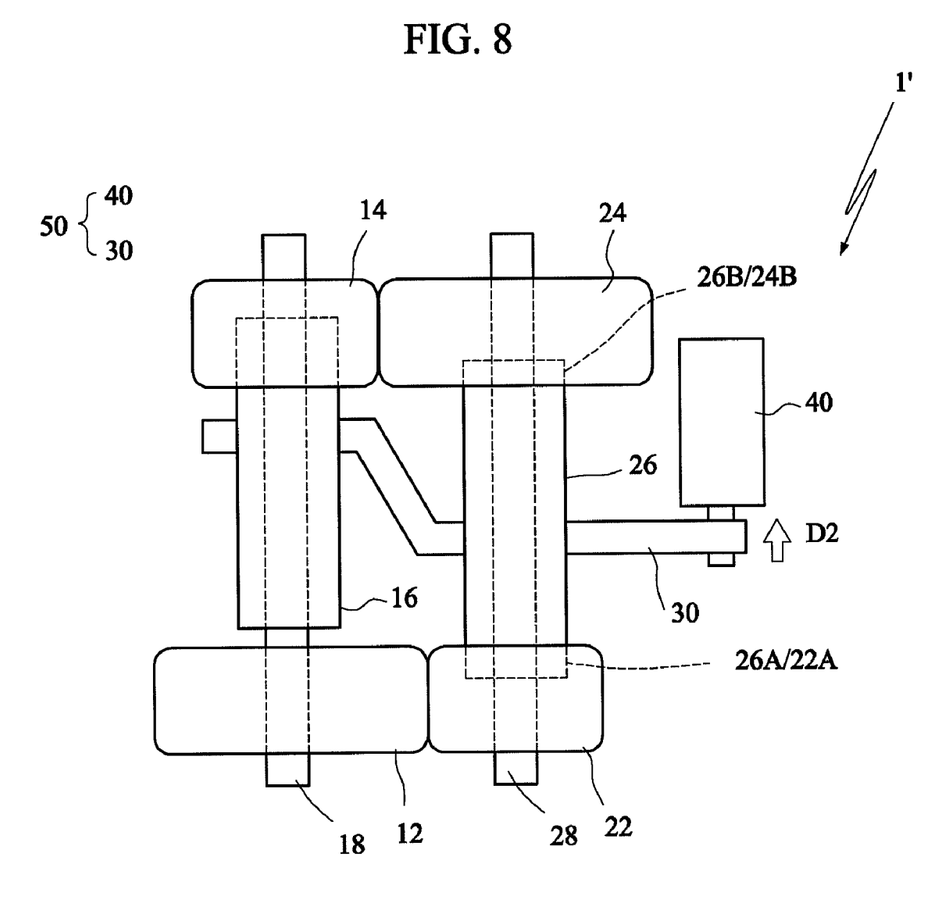

FIGS. 7 and 8 are schematic illustrations showing a transmission mechanism 1' according to a second embodiment of the invention. As shown in FIGS. 7 and 8, this embodiment is similar to the first embodiment except for the differences to be described hereinafter. In the transmission mechanism 1' of the second embodiment, the first transmission gear 12 meshes with the third transmission gear 22, so that the third transmission gear 22 receives the power from the first transmission gear 12. The second transmission gear 14 also meshes with the fourth transmission gear 24.

As shown in FIG. 7, the driving mechanism 50 drives the first power-connecting member 16 to move in the first direction D1, so that the first power-connecting member 16 connects the first transmission gear 12 to the second transmission gear 14. In this case, the second power-connecting member 26 is also synchronously moved in the first direction D1 and is thus disconnected from the fourth transmission gear 24. Therefore, the power is transmitted to the fourth transmission gear 24 through the first transmission gear 12 and the second transmission gear 14, and the fourth transmission gear 24 receives an output power from the second transmission gear 14.

As shown in FIG. 8, the driving mechanism 50 drives the second power-connecting member 26 to move in the second direction D2, so that the second power-connecting member 26 connects the third transmission gear 22 to the fourth transmission gear 24. In this case, the first power-connecting member 16 is also synchronously moved in the second direction D2 and is thus disconnected from the first transmission gear 12. Thus, the power is transmitted to the fourth transmission gear 24 through the first transmission gear 12 and the third transmission gear 22, and the fourth transmission gear 24 receives an output power from the third transmission gear 22.

Figure 9:
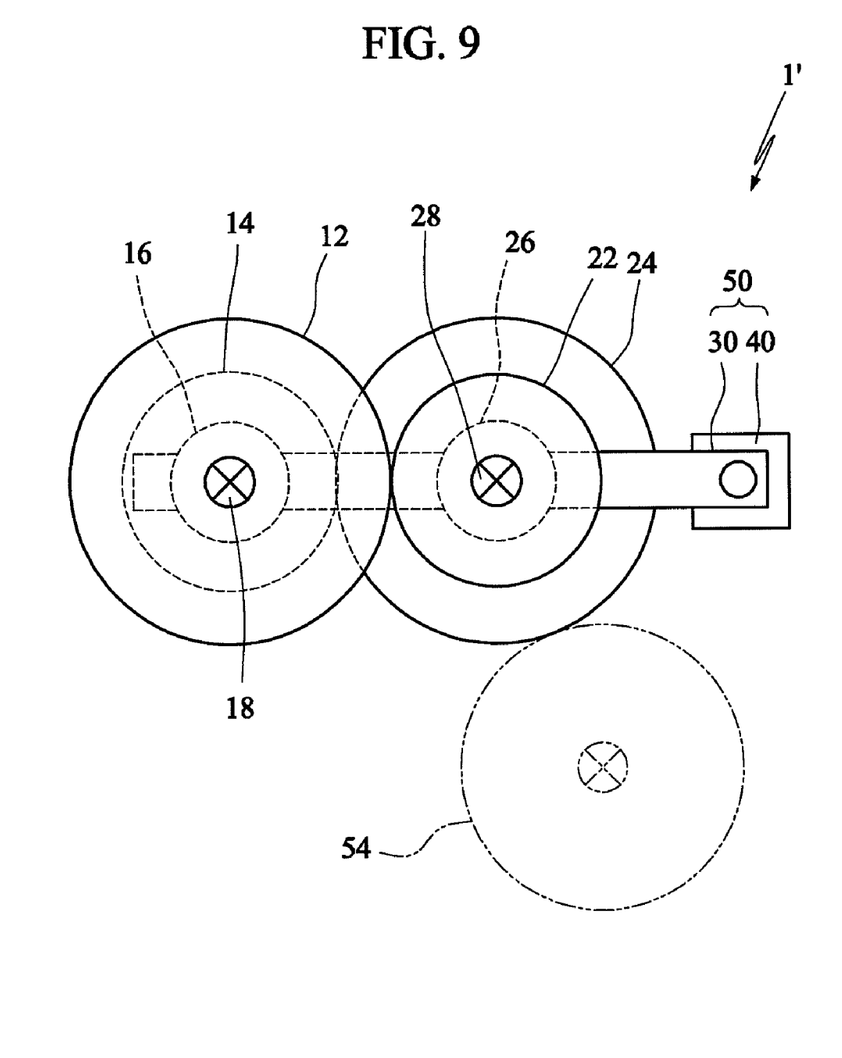
FIG. 9 is a side view showing the transmission mechanism of FIGS. 7 and 8.

FIG. 9 is a side view showing the transmission mechanism 1' of FIGS. 7 and 8. As shown in FIG. 9, the transmission mechanism 1' of this embodiment may further include an output terminal transmission gear 54 meshing with the fourth transmission gear 24 to receive the output power from the fourth transmission gear 24.

Figure 10:
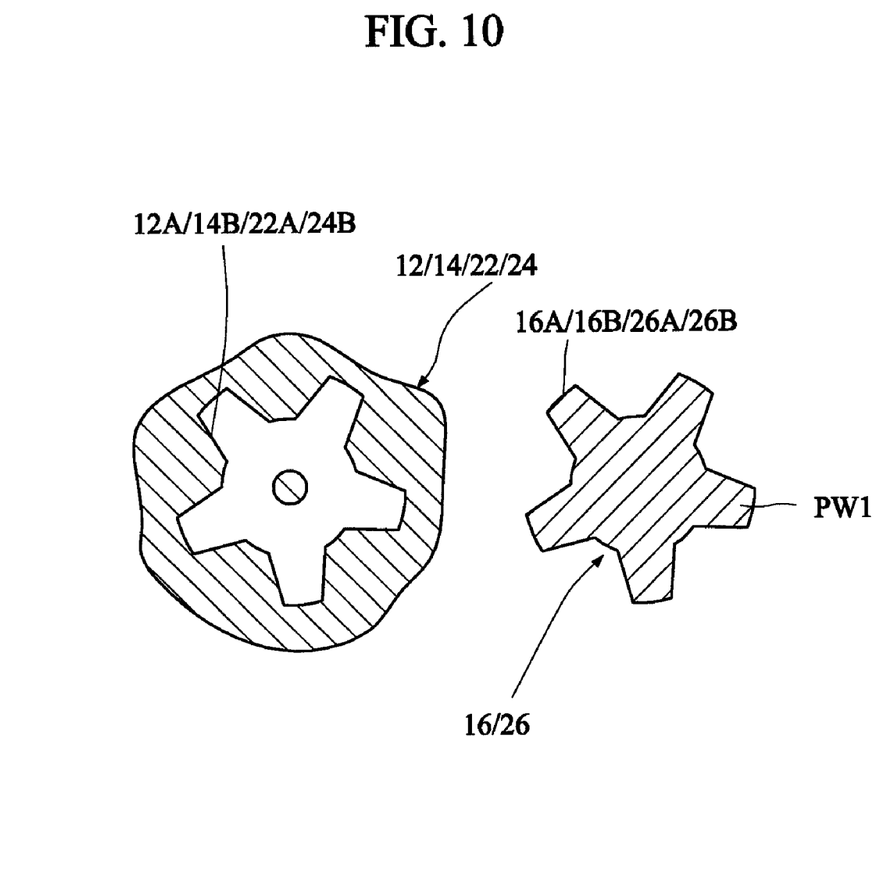
FIGS. 10 and 11 are cross-sectional views showing two examples of the transmission gears and the power-connecting members.
Figure 11:
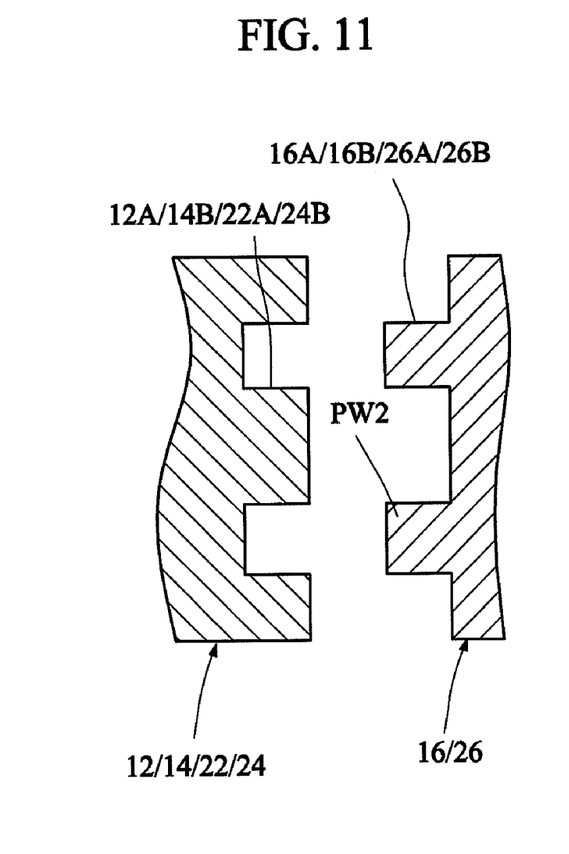

FIGS. 10 and 11 are cross-sectional views showing two examples of the transmission gears and the power-connecting members. As shown in FIGS. 10 and 11, the first input meshing portion 16A, the first output meshing portion 16B, the second input meshing portion 26A and the second output meshing portion 26B include pawl-like structures. The pawl-like structures have a plurality of radially projecting pawls PW1, as shown in FIG. 10, or a plurality of axially projecting pawls PW2, as shown in FIG. 11. The pawl-like structures of the meshing portions 16A, 16B, 26A, 26B are respectively interlocked with the corresponding recesses RC internally formed on the transmission gears (i.e., the first internal meshing portion 12A, the second internal meshing portion 14B, the third internal meshing portion 22A and the fourth internal meshing portion 24B) to achieve the objects of member connection and power transmission.

The first transmission gear 12, the second transmission gear 14, the third transmission gear 22 and the fourth transmission gear 24 according to each of the first and second embodiments may have different diameters, so that various gear reduction ratios may be achieved by the axial movement of the first power-connecting member 16 and the second power-connecting member 26. Thus, the output terminal transmission gear 54 may rotate at various rotational speeds according to the various gear reduction ratios. For example, when the output terminal transmission gear 54 receives the power from the second transmission gear 14, its rotational speed is different from that caused when it receives the power from the fourth transmission gear 24.

Figure 12:
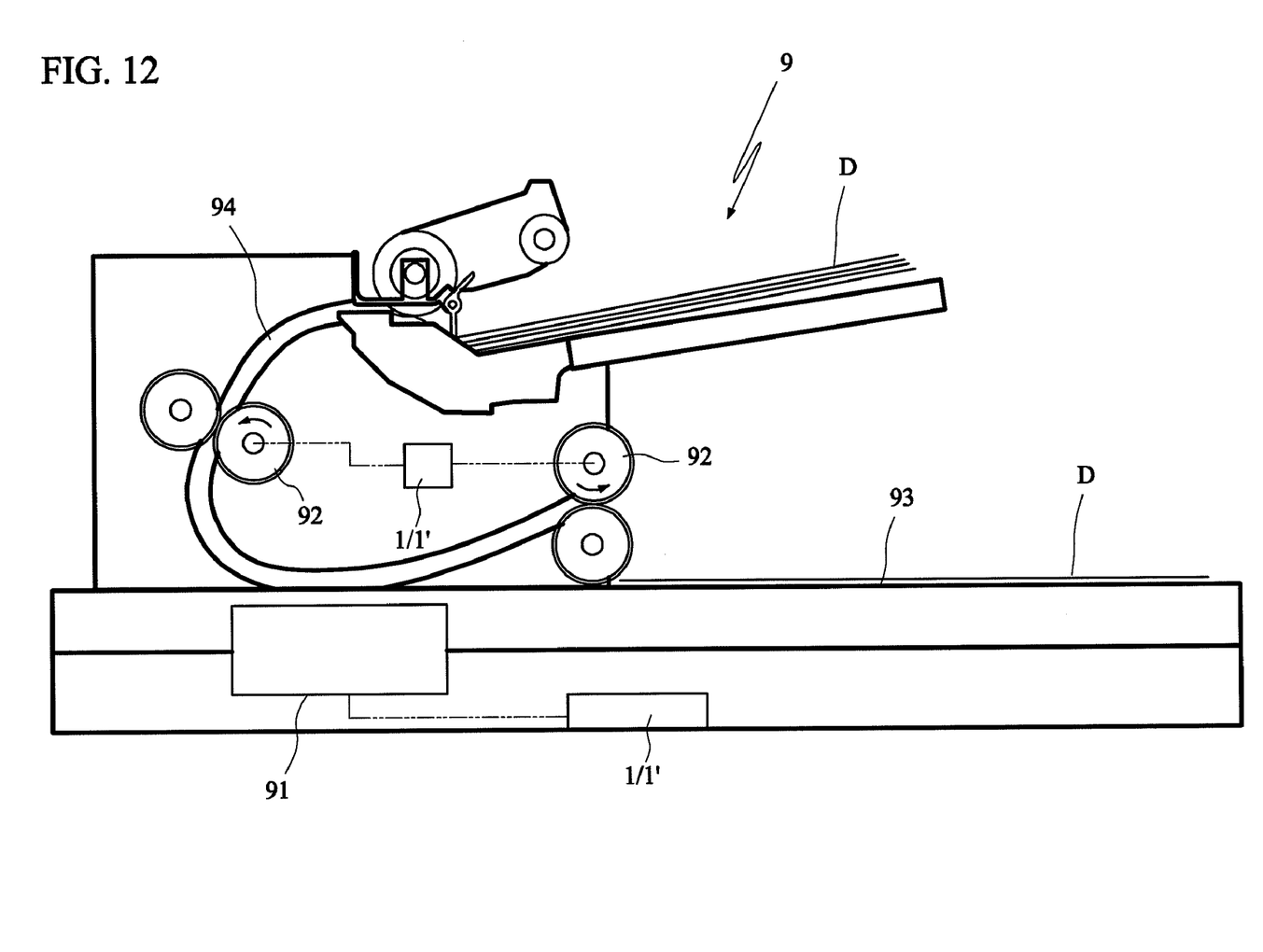
FIG. 12 is a schematic illustration showing a scanning apparatus according to the invention.

FIG. 12 is a schematic illustration showing a scanning apparatus 9 according to the invention. As shown in FIG. 12, both the transmission mechanisms 1 and 1' of this embodiment may be applied to the scanning apparatus 9. The scanning apparatus 9 includes a scanning module 91 and the transmission mechanism 1/1'. The scanning module 91, movably disposed in a housing, acquires an image of a document D placed on a scan platen 93. When the scanning module 91 is connected to and driven by the transmission mechanism 1/1', the scanning module 91 can be moved at a higher or lower speed according to different conditions or different scan resolutions because the transmission mechanism 1/1' may switch the rotational speeds of the transmission gears. Alternatively, the transmission mechanism 1/1' may also be connected to a sheet-feeding mechanism 92 to drive the sheet-feeding mechanism 92. Through the switching operation carried out by the transmission mechanism 1/1', the sheet-feeding mechanism 92 may transport the document D through a sheet passageway 94 and past the scanning module 91 at a higher or lower speed.

Therefore, the transmission mechanism and the scanning apparatus of the invention can eliminate the negative effects on the precision of the external teeth, and the structural strength and durability of the gear. In addition, the transmission mechanism performs the switching operation efficiently within a short stroke. Compared with the conventional rocker arm transmission device, the transmission mechanism of the present invention comprises fewer solenoids and loads.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A transmission mechanism for switching output powers, the transmission mechanism comprising:
    a first transmission gear;
    a second transmission gear;
    a first power-connecting member coaxially disposed between the first transmission gear and the second transmission gear, wherein the first power-connecting member is moved along a first axis and connects the first transmission gear to the second transmission gear to transmit power to the second transmission gear;
    a third transmission gear;
    a fourth transmission gear;
    a second power-connecting member coaxially disposed between the third transmission gear and the fourth transmission gear, wherein the second power-connecting member is moved along a second axis and connects the third transmission gear to the fourth transmission gear to transmit power to the fourth transmission gear; and
    a driving mechanism for synchronously driving the first power-connecting member and the second power-connecting member to respectively move along the first axis and the second axis to selectively connect the first transmission gear to the second transmission gear, or connect the third transmission gear to the fourth transmission gear.

2. The transmission mechanism according to claim 1, further comprising:
    an input terminal transmission gear, meshing with the first transmission gear and the third transmission gear, for transmitting power to the first transmission gear and the third transmission gear; and
    an output terminal transmission gear, meshing with the second transmission gear and the fourth transmission gear, for receiving a first output power coming from the second transmission gear, or a second output power coming from the fourth transmission gear.

3. The transmission mechanism according to claim 1, wherein the driving mechanism comprises:
  a driving member for synchronously moving the first power-connecting member and the second power-connecting member; and
  an actuator for driving the driving member.

4. The transmission mechanism according to claim 3, wherein the actuator is a solenoid.

5. The transmission mechanism according to claim 1, wherein:
  the first power-connecting member comprises a first input meshing portion and a first output meshing portion respectively connected to a first internal meshing portion of the first transmission gear and a second internal meshing portion of the second transmission gear; and
  the second power-connecting member comprises a second input meshing portion and a second output meshing portion respectively connected to a third internal meshing portion of the third transmission gear and a fourth internal meshing portion of the fourth transmission gear.

6. The transmission mechanism according to claim 5, wherein:
  the driving mechanism moves the first power-connecting member in a first direction to connect the first input meshing portion to the first internal meshing portion of the first transmission gear and to connect the first transmission gear to the second transmission gear; and
  the driving mechanism moves the second power-connecting member in a second direction to connect the second output meshing portion to the fourth internal meshing portion of the fourth transmission gear, and to connect the third transmission gear to the fourth transmission gear.

7. The transmission mechanism according to claim 5, wherein:
  the driving mechanism moves the first power-connecting member in a first direction to connect the first output meshing portion to the second internal meshing portion of the second transmission gear and to connect the first transmission gear to the second transmission gear; and
  the driving mechanism moves the second power-connecting member in a second direction to connect the second input meshing portion to the third internal meshing portion of the third transmission gear and thus to connect the third transmission gear to the fourth transmission gear.

8. The transmission mechanism according to claim 5, wherein the first input meshing portion, the first output meshing portion, the second input meshing portion and the second output meshing portion comprises pawl-like structures.

9. The transmission mechanism according to claim 8, wherein the pawl-like structures of the meshing portions are respectively interlocked with recesses internally formed on the first, second, third and fourth transmission gears.

10. The transmission mechanism according to claim 8, wherein the pawl-like structures of the meshing portions are radially projecting pawls.

11. The transmission mechanism according to claim 8, wherein the pawl-like structures of the meshing portions are axially projecting pawls.

12. The transmission mechanism according to claim 1, wherein the first transmission gear meshes with the third transmission gear such that the third transmission gear receives power from the first transmission gear, and the second transmission gear meshes with the fourth transmission gear.

13. The transmission mechanism according to claim 12, wherein the driving mechanism moves the first power-connecting member such that the first power-connecting member connects the first transmission gear to the second transmission gear, and the fourth transmission gear receives an output power from the second transmission gear.

14. The transmission mechanism according to claim 12, wherein the driving mechanism moves the second power-connecting member such that the second power-connecting member connects the third transmission gear to the fourth transmission gear, and the fourth transmission gear receives an output power from the third transmission gear.

15. The transmission mechanism according to claim 12, further comprising:
  an output terminal transmission gear meshing with the fourth transmission gear to receive an output power.

16. A scanning apparatus, comprising:
  a scanning module, movably disposed, for acquiring an image of a document; and
  the transmission mechanism according to claim 1 for transmitting power to the scanning module and switching a moving speed of the scanning module.

17. A scanning apparatus, comprising:
  a scanning module for acquiring an image of a document;
  a sheet-feeding mechanism for transporting the document; and
  the transmission mechanism according to claim 1 for transmitting power to the sheet-feeding mechanism and switching a speed at which the sheet-feeding mechanism transports the document.

* * * * *